(12) United States Patent  
Lindoff et al.

(10) Patent No.: US 8,903,349 B2
(45) Date of Patent: Dec. 2, 2014

(54) RECEIVER APPARATUS AND METHOD

(75) Inventors: Bengt Lindoff, Bjärred (SE); Fredrik Nordström, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 23 days.

(21) Appl. No.: 13/885,186

(22) PCT Filed: Nov. 24, 2011

(86) PCT No.: PCT/SE2011/051424
§ 371 (c)(1),
(2), (4) Date: May 14, 2013

(87) PCT Pub. No.: WO2012/074461
PCT Pub. Date: Jun. 7, 2012

(65) Prior Publication Data
US 2013/0237171 A1    Sep. 12, 2013

Related U.S. Application Data

(60) Provisional application No. 61/420,109, filed on Dec. 6, 2010.

(30) Foreign Application Priority Data

Nov. 29, 2010 (EP) .................................... 10193013

(51) Int. Cl.
H04B 1/16 (2006.01)
H04W 52/02 (2009.01)

(52) U.S. Cl.
CPC ...... *H04W 52/0261* (2013.01); *H04W 52/0232* (2013.01); *H04W 52/0274* (2013.01)
USPC ...... 455/343.1; 455/574; 455/130; 455/343.2; 455/345.5; 455/502

(58) Field of Classification Search
CPC .. H04W 52/02; H04W 52/09; H04W 52/0261
USPC .......... 455/574, 130, 343.1, 343.2, 343.5, 502
See application file for complete search history.

(56) References Cited

U.S. PATENT DOCUMENTS

| 5,361,397 | A | * | 11/1994 | Wright | .......................... | 340/7.36 |
| 6,980,838 | B2 | * | 12/2005 | Hiben et al. | .................... | 455/574 |
| 2008/0056170 | A1 | | 3/2008 | Komulainen et al. | | |
| 2008/0181127 | A1 | | 7/2008 | Terry et al. | | |
| 2008/0186892 | A1 | | 8/2008 | Damnjanovic | | |
| 2009/0232054 | A1 | | 9/2009 | Wang et al. | | |
| 2009/0238105 | A1 | | 9/2009 | Wu et al. | | |

FOREIGN PATENT DOCUMENTS

| EP | 1973355 | A1 | 9/2008 |
| EP | 2148519 | A1 | 1/2010 |
| GB | 2345416 | A | 7/2000 |
| GB | 2435985 | A | 9/2007 |

(Continued)

*Primary Examiner* — Tuan Pham
(74) *Attorney, Agent, or Firm* — Coats & Bennett, PLLC

(57) ABSTRACT

A receiver is operated in a first power mode, for example a high power mode, during a first portion of a particular connection state (for example, a RRC_CONNECTED state in LTE when the UE receiver is on) of a communication protocol being used by the telecommunications network, and a second power mode during a second portion of the particular connection state, for example a low power mode.

17 Claims, 11 Drawing Sheets

(56) References Cited

FOREIGN PATENT DOCUMENTS

| WO | 2005084379 | A2 | 9/2005 |
| WO | 2007066875 | A2 | 6/2007 |
| WO | 2008054103 | A1 | 5/2008 |
| WO | 2008086532 | A1 | 7/2008 |
| WO | 2008137596 | A1 | 11/2008 |

* cited by examiner

RECEIVER APPARATUS AND METHOD

TECHNICAL FIELD

The invention relates to a receiver apparatus and method, and in particular to reducing power consumption in a receiver apparatus of a telecommunications network.

BACKGROUND

Power is a limited resource in a handheld mobile communication device. Therefore, there is a continuous need to reduce power consumption in such mobile communication devices.

At the same time, due to an increased need for higher data rates and good performance in high load cellular systems, there is a continuous need for improving the modem performance. The modem can be split into three major parts with respect to power consumption, namely the transmitter, receiver and digital baseband sections. The analog transmitter part typically dominates the power consumption in the case of a high transmit power (for example greater than 15 dBm), which typically occurs at the cell coverage border, or when high uplink data rates are needed. The digital baseband part is typically significant only when receiving and decoding very high data rates (for example greater than 10 Mb/s). Finally, the receiver tends to be the part that is typically on for longer periods than the transmitter, both in the case of low and high data rates, and therefore due to the utilization time, is a large contributor to the overall power consumption in a mobile terminal.

FIG. 1 shows an exemplary telecommunications network 10, for example the Evolved Universal Mobile Telecommunications System terrestrial radio access network (E-UTRAN) which uses the Long Term Evolution (LTE) standard. The system 10 comprises a plurality of radio base stations (also known as eNodeBs, NodeBs, etc) 12a, 12b, 12c, each of which maintains one or more cells (not illustrated). User Equipment (UEs) 14a, 14b, 14c, 14d within each cell communicate with a corresponding radio base station 12 of that cell.

In E-UTRAN, radio base stations are capable of communicating with one another over interfaces known as X2 interfaces (illustrated as dashed lines in FIG. 1). Each radio base station 12 further has one or more interfaces with the core network. These are known as S1 interfaces (illustrated as solid lines in FIG. 1). In particular, the radio base stations 12 have one or more interfaces to one or more mobility management entities (MMES) 16a, 16b (known as S1-MME interfaces). As will be appreciated by a person skilled in the art, the telecommunications network 10 will include other nodes and interfaces not shown, including (but not limited to) nodes such as Serving Gateways (S-GWs), Packet Data Network Gateways (PDN-GWs), Serving GPRS Support Nodes (SGSNs) and Home Subscriber Servers (HSSs), plus interfaces such as S1-U, S5, S6a, S3, and so forth.

UEs in a LTE telecommunications network can be in one of two main operating modes or connections states, a Radio Resource Control (RRC) idle mode (RRC_IDLE) or a RRC connected mode (RRC_CONNECTED). In the RRC_IDLE mode, a UE is not known on a cell level but rather on a much larger routing area level. This mode is very energy efficient as the UE does not need to perform handovers, and only needs to read a paging channel from time to time, but no other control channels.

The transitions to lower energy consuming states in a UE receiver occur when the network changes operating mode from one connection state to another. For example, the transitions of power consumption can be controlled on the transitions from a CELL_DCH state to a CELL_FACH state, a transition from a CELL_FACH state to a CELL_PCH state, and a transition from a CELL_PCH state to an idle mode in HSPA.

In order to handle bursty traffic scenarios (for example IP traffic), telecommunication networks utilize different timers for when and how long a UE needs to listen and decode a (typically shared) control channel. When in a RRC_CONNECTED mode in LTE, or a CELL_DCH mode in a High Speed Packet Access (HSPA) network, for example, a UE may be configured to operate in a Discontinuous Reception (DRX) mode of operation as shown in FIG. 2. A DRX cycle may be set at 320 ms, for example. An on-timer T1, for example set to 5 ms, specifies how long during each DRX cycle the UE must decode the control channel, for example the Physical Downlink Control Channel (PDCCH) in LTE as shown, (or the High Speed Shared Control Channel (HS-SCCH) in HSPA). An inactivity-timer T2, for example set to 100 ms, specifies how long the UE must decode the control channel after the last packet is received. If the inactivity-timer expires without the receiver having detected a further packet, then the UE receiver changes its state, from where the receiver is on to where the UE receiver is off until the next DRX period, thus saving power. This may occur for example in the LTE connection state RRC_CONNECTED. It will be appreciated that the inactivity-timer T2 is not used if no packet is sent to the UE.

While such solutions enable UE power savings by turning off the receiver in a connected state of a telecommunication protocol, they have the disadvantage of not fully utilizing the possibilities for power consumption reduction in the radio receiver.

In particular, some of the timers mentioned above are used and set in order to ensure that no delayed packets will be missed, which typically means that they are designed based on worst case delay scenarios that may rarely happen in practice. Examples of such known systems are disclosed in EP2148519, WO2008/054103, US2008/181127 and WO2008/086532.

SUMMARY

It is an aim of embodiments of the present invention to provide a receiver apparatus and method that reduce power consumption.

According to a first aspect of the present invention there is provided a method of reducing power consumption in a receiver apparatus of a telecommunications network. The method comprises the steps of: operating the receiver in a first power mode during a first portion of a particular connection state of a communication protocol being used by the telecommunications network; and operating the receiver in a second power mode during a second portion of the particular connection state. The second power mode is a reduced power mode compared to the first power mode. The receiver is on during the first portion and the second portion of the particular connection state.

This has the advantage of being able to switch power modes within a particular connection state, such as a RRC_CONNECTED state in LTE when the UE receiver (RX) is on, thus saving power without significantly affecting the performance of the system.

According to another aspect of the present invention there is provided a receiver apparatus comprising a power control unit, wherein the power control unit is adapted to operate the receiver in a first power mode during a first portion of a particular connection state of a communication protocol being used by a telecommunications network, and operate the receiver in a second power mode during a second portion of the particular connection state. The second power mode is a reduced power mode compared to the first power mode. The receiver is on during the first portion and the second portion of the particular connection state.

According to one embodiment, a power mode timer unit is provided for controlling the power control unit, for example wherein the power mode timer unit is triggered by one or more timing signals received from the telecommunications network.

According to one embodiment, the duration of the power mode timer unit is dynamically adapted during use, based on historical data received from one or more previous operations of the connection state. This has the advantage of enabling the power saving to be optimised for a particular application or environment.

According to one embodiment, the first portion of the connection state comprises a control information receiving period at the receiver (for example for receiving control signaling of the control channel PDCCH in LTE), and the second portion of the connection state comprises a control information decoding period at the receiver. This has the advantage of enabling the receiver apparatus to adapt power requirements according to the particular task being performed within a particular connection state.

A connection state can be a state that repeats in a particular pattern, for example whereby a control channel is monitored with a certain regularity, or according to a particular pattern.

The first portion of a connection state can comprise a "first part" of a connection state, or "first time period within a connection state". The same applies to the second and third portions, whereby these can include a second part or third part respectively, or second period of time within a connection state or third period of time within a connection state, respectively.

BRIEF DESCRIPTION OF THE DRAWINGS

For a better understanding of the present invention, and to show more clearly how it may be carried into effect, reference will now be made, by way of example only, to the following drawings in which:

FIGS. 3b and 3c further illustrate the method of FIG. 3a;

DETAILED DESCRIPTION

The embodiments below will be described in relation to a Radio Resource Control (RRC) protocol of an Evolved Universal Mobile Telecommunications System terrestrial radio access network (E-UTRAN). It is noted, however, that the invention is not limited for use with such a telecommunication protocol or network, but may be used with other telecommunication protocols and networks including, but not limited to, a High Speed Packet Access (HSPA) network.

Figure 1:
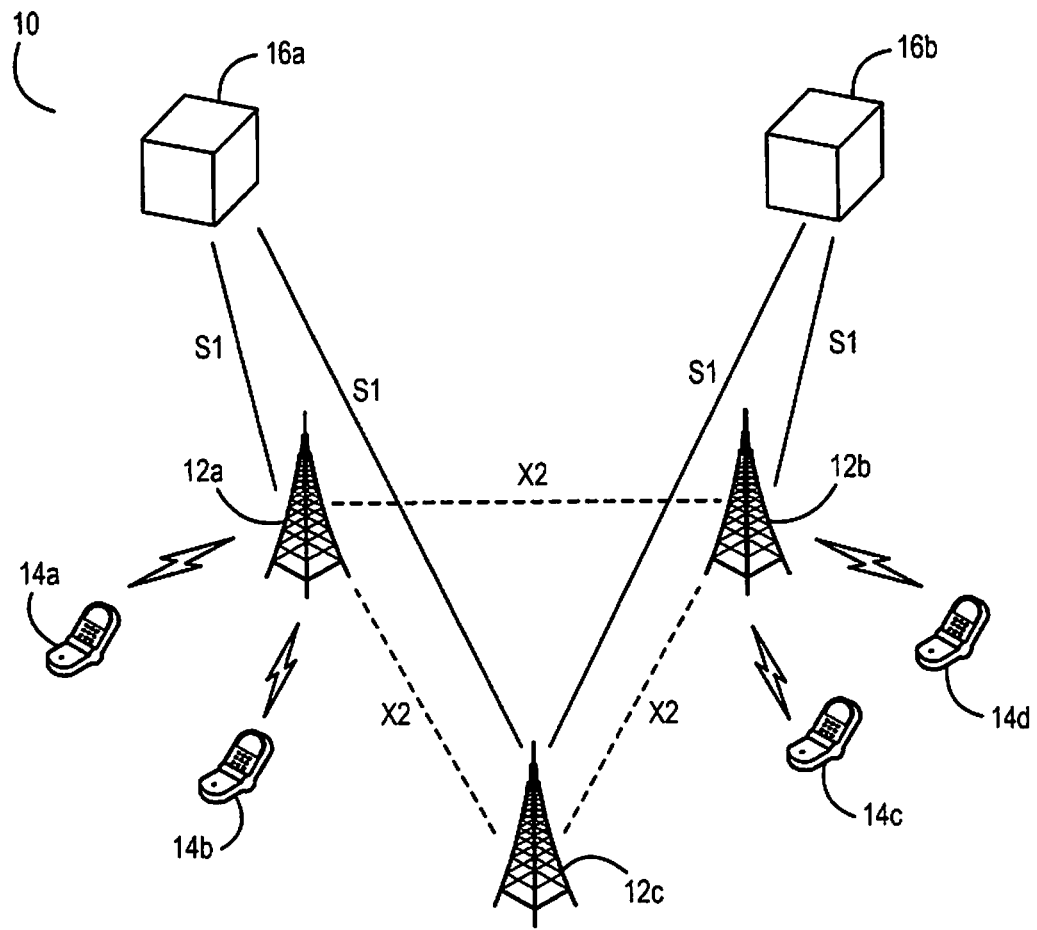
FIG. 1 shows an example of a telecommunications network.
Figure 2:
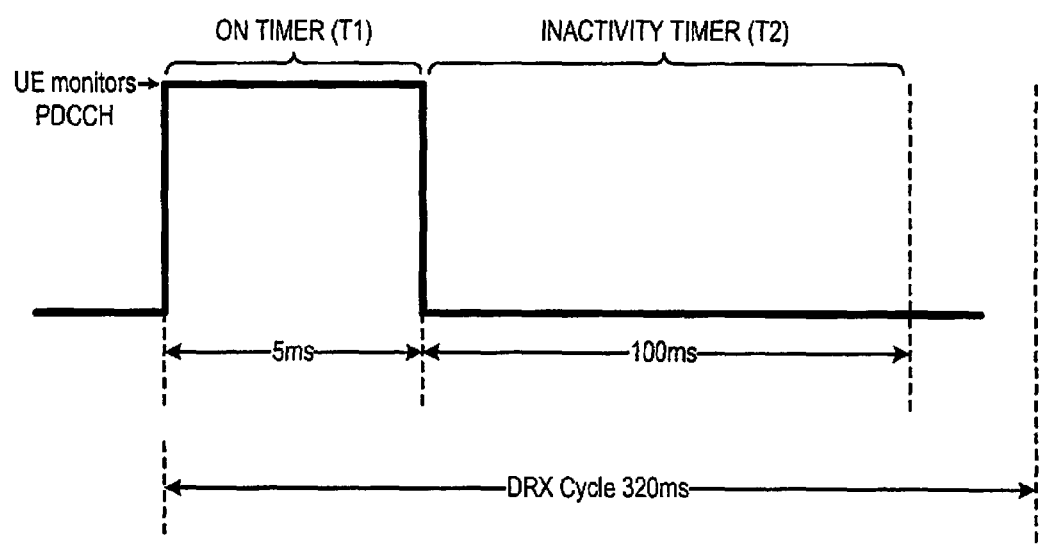
FIG. 2 illustrates an example of a discontinuous reception (DRX) mode cycle.
Figure 3A:
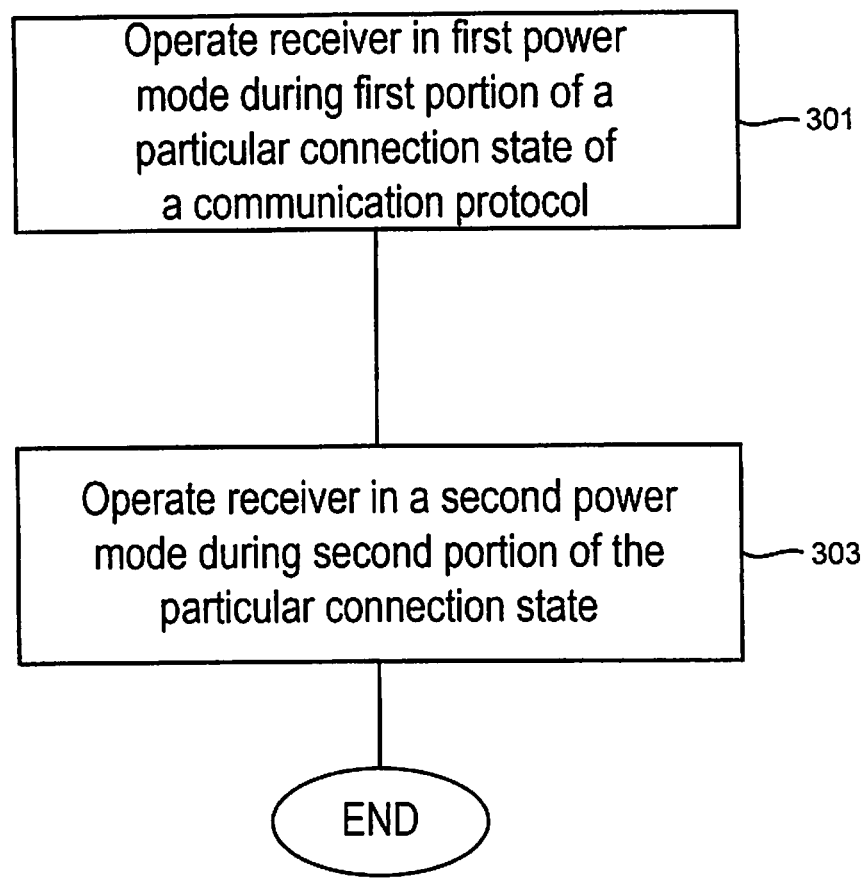
FIG. 3a shows a method according to a first aspect of the present invention.

FIG. 3a shows a flow chart describing the steps performed by an embodiment of the present invention. In step 301 a receiver is operated in a first power mode during a first portion of a particular connection state of a communication protocol being used by the telecommunications network. For example, in LTE a particular connection state that may be utilized in certain embodiments of the described communications network may include, but not be limited to, the RRC_CONNECTED state. The first power mode may be a high power mode, for example. In step 303 the receiver is operated in a second power mode during a second portion of the particular connection state. The second power mode may be a low power mode, for example.

As such, according to the embodiment of FIG. 3a the power mode of the receiver is adapted or changed within a particular connection state of the network. This has an advantage of reducing power consumption of the receiver compared to the prior art, wherein power modes are not changed during operation of the receiver in the prior art, but rather the receiver being merely on or the receiver being off depending on when the UE needs or does not need to monitor a control channel or when the network is transitioning from one connection state to another connection state. The connection state can be a state that repeats in a particular pattern, for example whereby a control channel is monitored with a certain regularity, or according to a particular pattern.

Figure 3B:
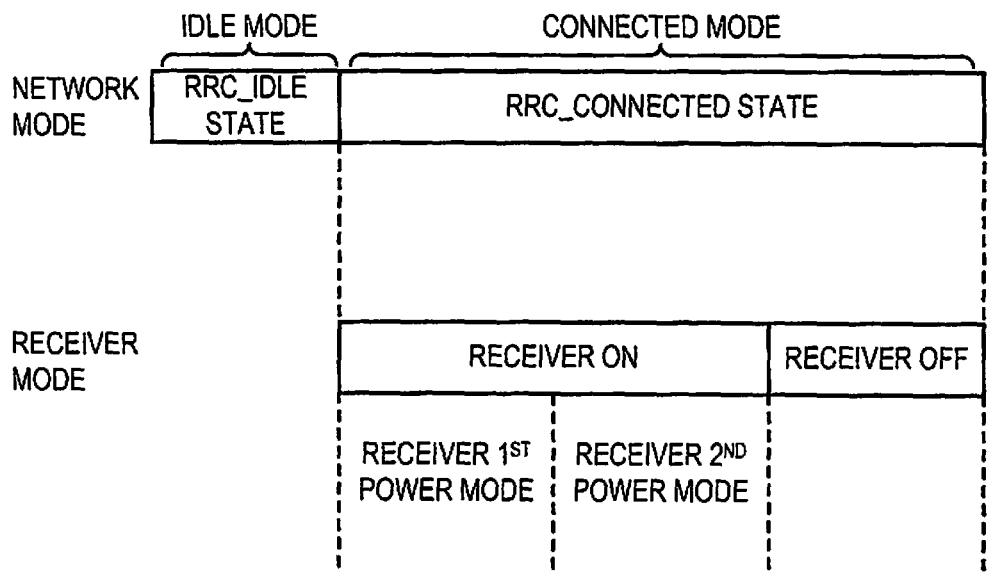
Figure 3C:
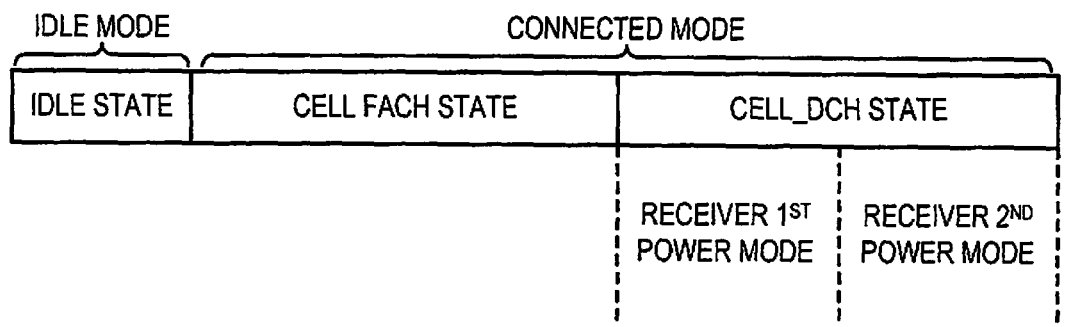

FIGS. 3b and 3c illustrate further how first and second power modes of the receiver may be used within a particular connection state of the network. FIG. 3b shows the idle and connected modes of an LTE system, and how, in the connected state or mode called RRC_CONNECTED, the receiver can have a first power mode of operation in a first portion of the RRC_CONNECTED state when the receiver is on, and a second power mode of operation in a second portion of the RRC_CONNECTED state when the receiver in on. FIG. 3c shows the idle and connected modes in a HSPA system, and how one of the connection states can have a first power mode of operation in a first portion of the connection state, and a second power mode of operation in a second portion of the connection state. It will be appreciated that first and second power modes can also be used within other connection states (for example Cell_FACH) as well as in other connection states of other telecommunication systems. The first portion of the connection state can comprise a "first part" of a connection state, or "first time period within a connection state". The same applies to the second portion, which can include a second part, or second period of time within a connection state.

Figure 3D:
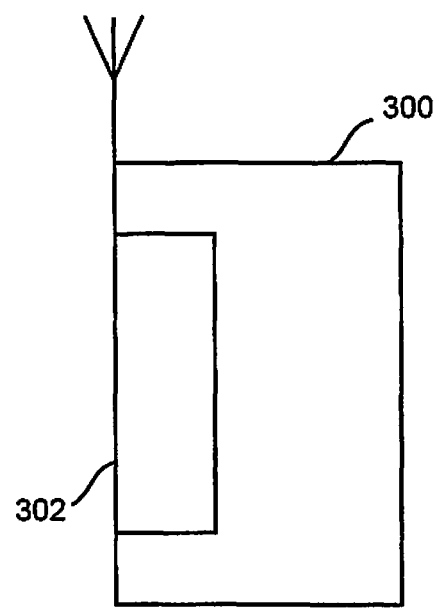
FIG. 3d shows a receiver according to one embodiment.

FIG. 3d shows an embodiment of a receiver apparatus 300 that is adapted to perform the method described in the embodiment of FIGS. 3a, 3b and 3c. The receiver apparatus 300 comprises a power control unit 302 that is adapted to operate the receiver in a first power mode during a first portion of a particular connection state of a communication protocol being used by a telecommunications network, and operate the receiver in a second power mode during a second portion of the particular connection state. It will be appreciated that the receiver may comprise one or more other components that are typically found in a receiver apparatus, and only those parts which are specific to the invention have been illustrated for purposes of clarity.

As will be described in greater detail below, according to one embodiment the receiver is adapted to change from a first power mode to a second power mode during a particular connection state based on a timer parameter, for example wherein the timer parameter is related to one or more network timers. According to another embodiment, also described in greater detail below, the receiver is adapted to change from a first power mode to a second power mode during a particular connection state based on symbol timing in a sub-frame of data being received.

As mentioned above, in low data rate scenarios where a Discontinuous Reception (DRX) mode is enabled in a network connected state (such as a RRC_CONNECTED state in LTE or Cell_DCH state in HSPA), the UE receives a number of network timing parameters, such as an on-timer determining how long during each DRX cycle the terminal must decode the control channel (for example PDCCH in LTE, HS-SCCH in HSPA), and an inactivity-timer, stating how long the terminal must decode the control channel after the last received packet.

Figure 4:
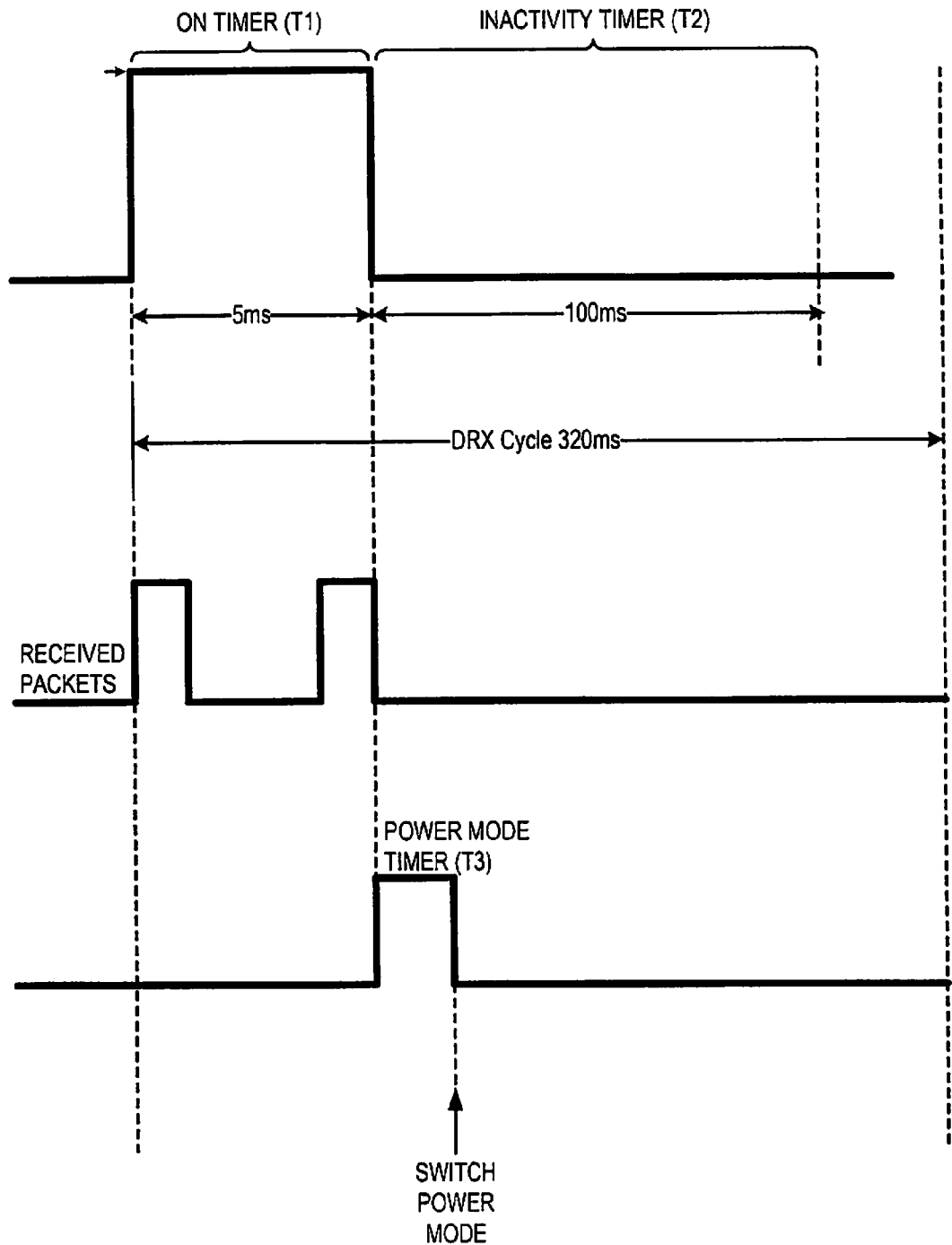
FIG. 4 relates to an embodiment of the present invention having a power mode timer.

FIG. 4 shows an example of an embodiment where a receiver is adapted to change from a first power mode to a second power mode during a particular network connection state based on a network timer. A DRX cycle may be set at 320 ms, for example. An on-timer, for example set to 5 ms, specifies how long during each DRX cycle the UE must decode the control channel (e.g. PDCCH in LTE, HS-SCCH in HSPA). If a packet is received during the on-timer, an inactivity-timer T2, for example set to 100 ms, specifies how long the UE must decode the control channel after the last packet to the UE is received.

According to this embodiment, a power mode timer T3 is provided for controlling a transition from a first power mode to a second power mode. The power mode timer T3 may be provided within the receiver apparatus. The power mode timer T3 is configured to expire a predetermined time after the inactivity-timer T2 has commenced. For example, the power mode timer T3 may be configured to expire, for example, 10 ms after the start of the inactivity-timer T2. The receiver is controlled to change from a first power mode to a second power mode after the power mode timer T3 has expired.

This means that the receiver can change from a first power mode to a second power mode while the receiver is still operating, and thus enable power to be saved much sooner than would otherwise be possible if the receiver waited for the inactivity-timer T2 to expire, at which point the receiver is turned off. The receiver is therefore configured to change from a first power mode to a second power mode while the receiver is operating, and while within a particular connection state of the network.

According to one embodiment, the duration of the power mode timer T3 may be set according to historical data, for example collected from previous DRX cycles. The historical data may be used to determine statistical data relating to how long after the on-timer has expired a receiver has received delayed data packets in previous DRX cycles. For example, with a DRX cycle of 320 ms, an on-timer of 5 ms and inactivity-timer of 100 ms, from earlier DRX cycles the UE may have determined that there is only a 1% chance that a delayed packet is received later than say 15 ms of the on-timer having expired. The power mode timer T3 can therefore be set to 15 ms based on this historical data. It is noted that the invention is intended to cover the power mode timer T3 being set at one or more different durations and/or based on one or more different criteria. For example, the power mode timer T3 could be a factory set threshold. According to another embodiment, the duration of the power mode timer T3 can be set relative to the length of the inactivity-timer T2, for example a certain percentage of the duration of the inactivity timer T2. According to yet another embodiment, the power mode timer may be set according to the type of service that is used in the UE. One or more of the above criteria may be used to set the power mode timer T3.

In the example above, during this first portion of the connection state, i.e. the first 15 ms of the inactivity-timer, the receiver can be configured in a first power mode. The first power mode may comprise the receiver being adapted, for example, to have two receiver antenna chains. When the power mode timer T3 expires, the receiver is adapted to operate in a second power mode, for example wherein only one receiver antenna is used. The receiver can therefore still monitor received packets during the remaining period of the inactivity-timer, albeit at a lower power mode. If a packet is detected to be received during the second power mode, the receiver can be configured to change to another power mode, such as the first power mode of operation, for example using the two receiver antennas again.

It is noted that the power mode timer T3 may be dynamically adapted during use based on such historical data, for example based on information gathered during one or more previous DRX cycles, such that the duration of the power mode timer T3 changes according the delays found in a particular environment.

Thus, this embodiment of the invention takes advantage of the fact that the probability of receiving a delayed packet during the latter part of the inactivity-timer is low, and the receiver is therefore controlled to change power mode during this period without significantly affecting the ability of the receiver to detect a delayed packet, but while significantly reducing power consumption.

Figure 5:
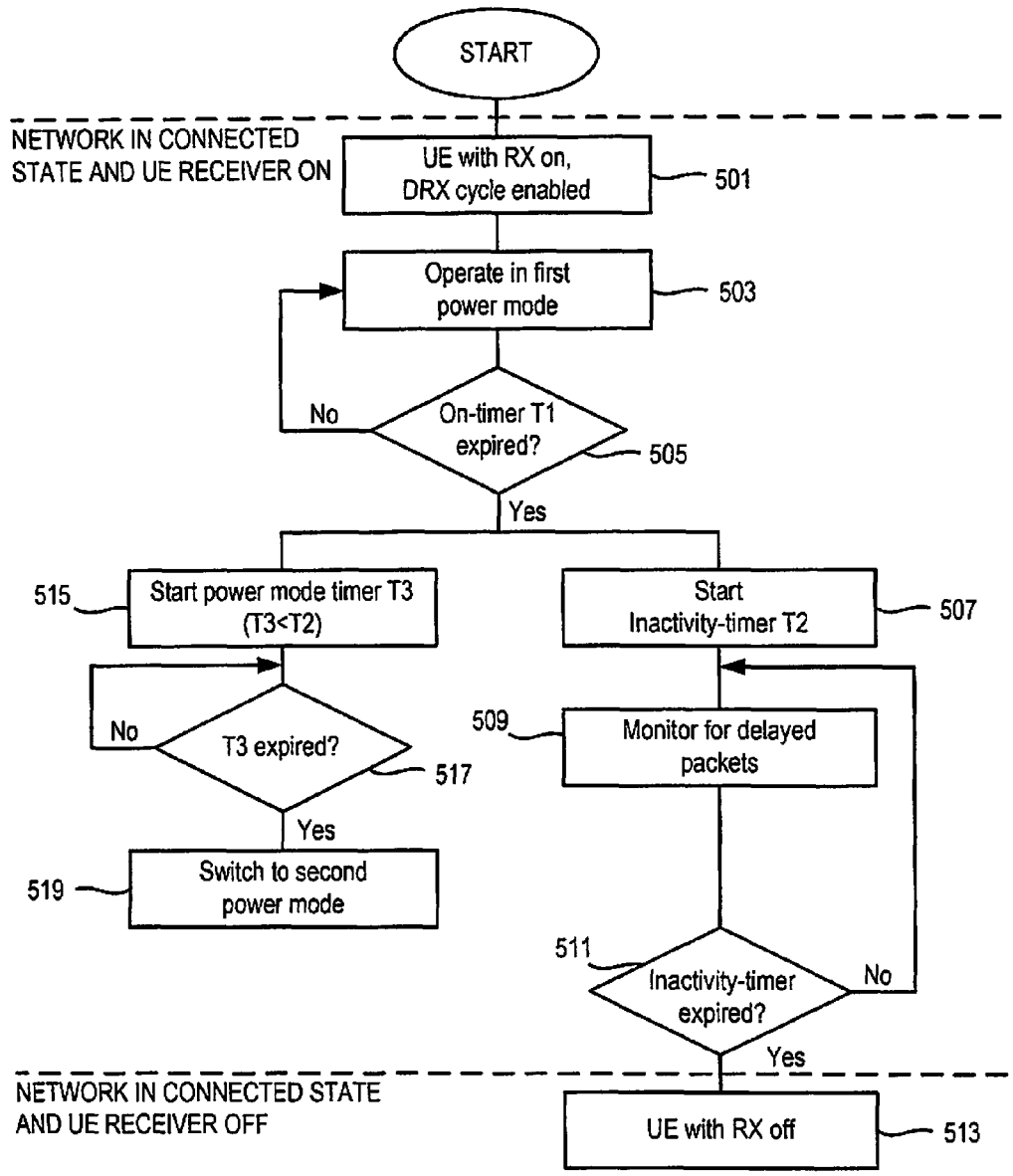
FIG. 5 shows the steps performed by an embodiment as described in FIG. 4.

FIG. 5 describes in further detail the method described above in relation to FIG. 4. In step 501 the UE is in an active state (with its receiver on, i.e a RX_ON state), for example, with a DRX cycle enabled. The network may be in a RRC_CONNECTED state in LTE or a CELL_DCH state in HSPA, for example. In a new DRX cycle the receiver will be on, and the on-timer T1 will be started. The receiver apparatus will have received any necessary information for possible DRX cycles, for example DRX cycle length, on-timer and inactivity-timers. Such messages may be received via RRC messages in LTE, or obtained from broadcast information from the network.

In this state the receiver is operated in a first power mode, step 503, for example whereby the receiver is configured to have a first set of receiver antennas (such as a plurality of receiver antennas). During this period the receiver receives and decodes control and data channels. In step 505 it is determined whether or not the on-timer T1 has expired.

Once it is determined that the on-timer T1 has expired (and assuming a packet was received by the UE during the period that the on-timer T1 was active), an inactivity-timer T2 is started, step 507. During the duration of the inactivity-timer T2 the receiver continues to monitor for any delayed packets, step 509, until it is determined in step 511 that the inactivity-timer T2 has expired, at which time the receiver can be configured to change operating state if no delayed packets have been detected, step 513 (for example from the receiver RX_ON state to a receiver RX_OFF state in which the receiver is turned off in the network connected state (e.g. RRC_CONNECTED in LTE or Cell_DCH in HSPA) until the next DRX cycle. It will be appreciated that if no packet was received by the UE while the on-timer T1 was active (in steps 503 and 505), then processing would flow from step 505 to step 513 once the on-timer T1 has expired.

According to the embodiment of FIG. 5, in conjunction or in parallel with the inactivity-timer T2 being started in step 507, a power mode timer T3 is also triggered in step 515. The power mode timer T3 is provided within the receiver. The power mode timer T3 has a duration which is less than the duration of the inactivity-timer T2 (i.e. T3<T2). As mentioned above, the duration of the power mode timer T3 may be based on historical data which has previously been gathered, or one or more other criteria as specified above.

In step 517 it is determined whether or not the power mode timer T3 has expired. If so, the receiver is adapted to change to a second power mode of operation, step 519. In the second power mode of operation the receiver may be configured, for example, to use a second set of receiver antennas (for example having fewer antennas than in the first set of receiver antennas). Since the duration of the power mode timer T3 is less than the inactivity-timer T2, this means that the receiver will be adapted to operate in the second power mode during the remainder of the inactivity-timer T2 (i.e. during the remainder of step 509 which monitors for delayed packets), thus saving power during this period that would otherwise not be saved. In other words, while the UE monitors for delayed packets in the loop between steps 509 and 511, the UE may be configured to operate in a first power mode during a first portion of this connection state, and in a second power mode during a second portion of this connection state.

If during the remainder of the inactivity-timer T2 a packet is detected to be received, the receiver may be adapted, if desired, to change to another power mode, for example revert to the first power mode.

With the proposed embodiment, the receiver is still able to detect the control signalling during the entire duration of the inactivity-timer T2, however with lower performance after the expiry of the power mode timer T3, but since the likelihood of receiving data is very small the performance loss is negligible, but the power savings are large.

Figure 6:
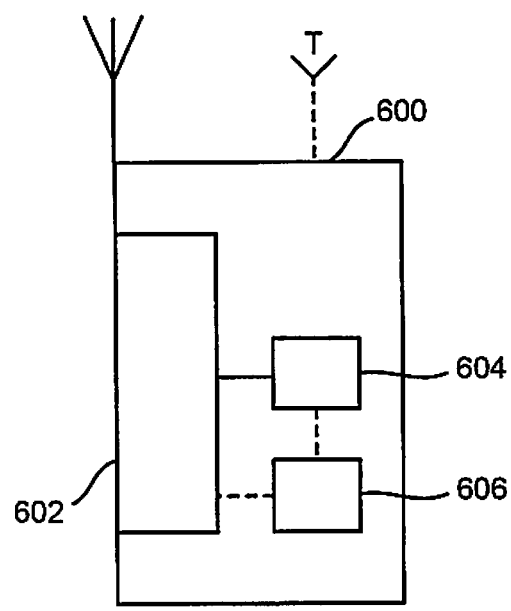
FIG. 6 shows a receiver according to an embodiment relating to FIGS. 4 and 5.

FIG. 6 shows an embodiment of a receiver apparatus 600 that is adapted to perform the method described in FIGS. 4 and 5. The receiver apparatus 600 comprises a power control unit 602 that is adapted to operate the receiver in a first power mode during a first portion of a particular connection state of a communication protocol being used by a telecommunications network, and operate the receiver in a second power mode during a second portion of the particular connection state. The receiver apparatus further comprises a power mode timer unit 604 for controlling when the power control unit transitions from a first power mode to a second power mode. The power mode timer unit 604 is triggered in relation to one or more network timers T received by the receiver 600. According to one embodiment, the receiver apparatus 600 may further comprise a memory unit 606 for storing historical data for adaptively controlling the power mode timer 604, as described earlier in the application.

Optionally, with any of the embodiments described above, a threshold parameter, for example a signal-to-noise (SNR) threshold, can be applied to the invention, such that the power mode is only changed if the SNR is above a certain level. In this manner the provision of the power mode control can be dynamically used depending on the SNR in a particular environment/location of the UE. In such an option the parameter such as SNR can be used to override the power mode control, such that a change of power mode during a particular connection state is only enabled if some other parameter such as SNR is satisfied.

According to another embodiment of the invention, the receiver may be adapted to change power modes according to a timing related to a subframe. In LTE, for example, the control signalling channels (PDCCH, PCFICH, PHICH) are transmitted in the initial symbols of a subframe, for example the first to third symbols of a subframe (or first to fourth symbols for very low bandwidths), with the remainder of the subframe consisting of data and pilot signals. Thus, the decoding requirements can be different for different parts of the subframes.

Figure 7:
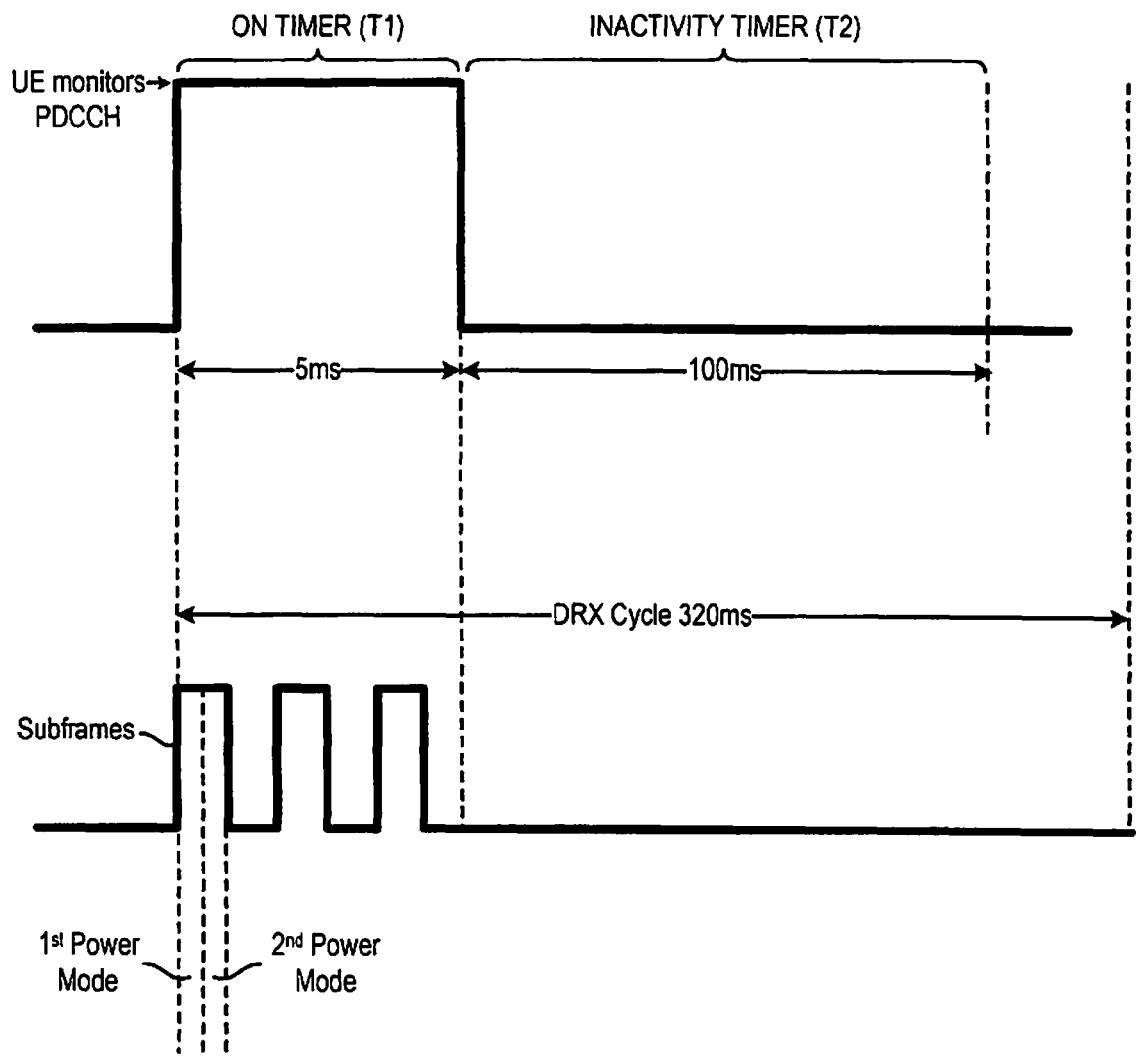
FIG. 7 relates to another embodiment of the present invention.

FIG. 7 shows how a receiver may be operated in a first power mode during the reception of the initial symbols of a subframe while an on-timer T1 is active, with the receiver being operated in a second power mode during a subsequent portion of a subframe while the received symbols are being decoded. A subframe has a duration of typically 1 ms, such that the on-timer T1 can typically consist of several subframes.

Figure 8:
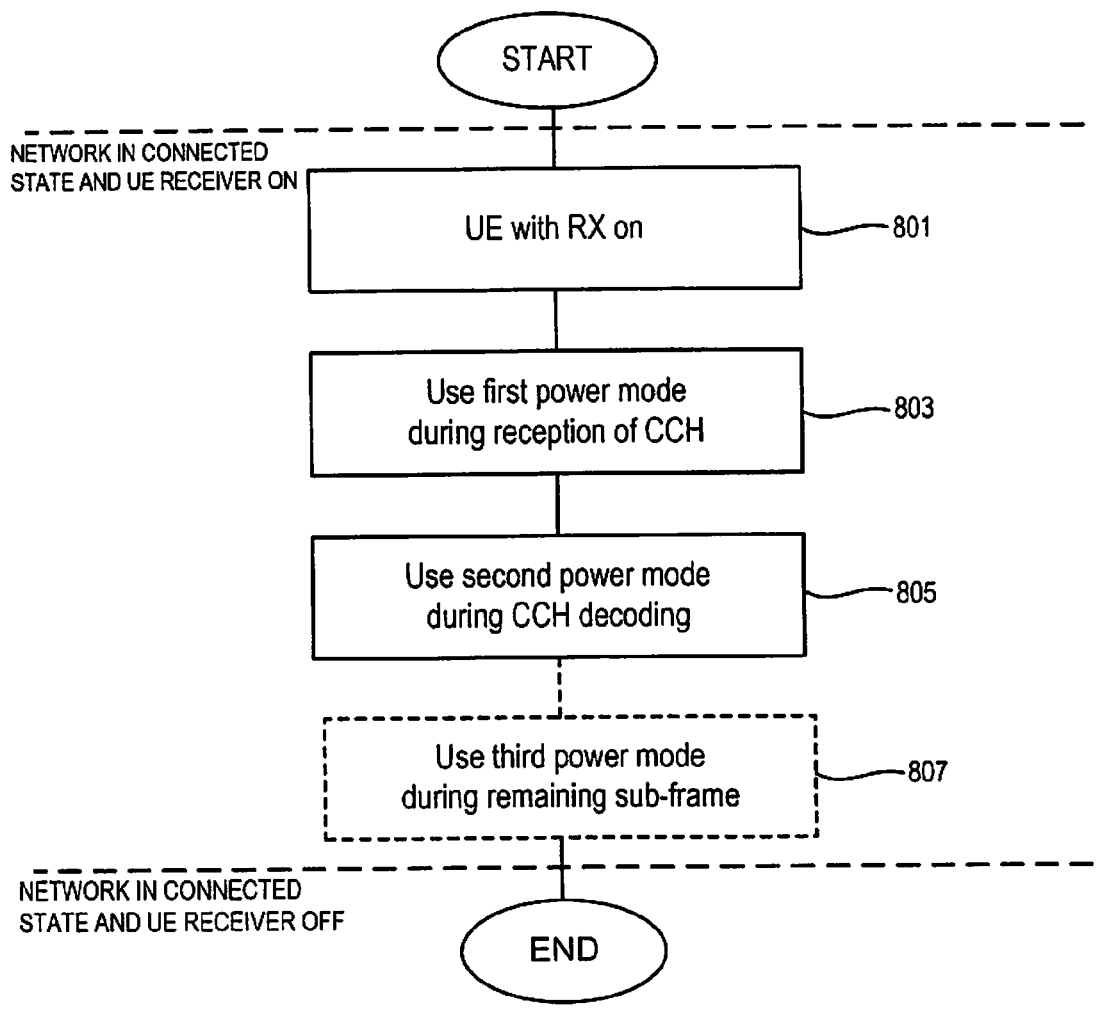
FIG. 8 shows the steps performed by a receiver according to the embodiment described in FIG. 7.

FIG. 8 shows the steps performed by a method according to an embodiment of the invention as described in FIG. 7. In step 801a UE is shown as being in an active state (with the receiver on, i.e. RX_ON state), for example in the network state RRC-_CONNECTED in LTE or Cell_DCH in HSPA. During the first symbols of a subframe when the terminal is receiving the control channel (CCH) information (a receiving period at the receiver) the receiver is adapted to operate in a first power mode, step 803, for example whereby a first set of receiver antennas is used. Because it is important from the point of view of the UE and system performance that the CCH is received correctly, in the first power mode the first set of receiver antenna may be a high performance or high power set. For example, two out of two antennas and receiver chains may be used in the UE.

When the UE has received the CCH symbols the receiver is adapted to switch to a second power mode during a CCH decoding period at the receiver, step 805, for example where a second set of receiver antennas are used while decoding the control channel. This second set of receiver antennas can be a low performance or low power set, such that the UE does not consume unnecessary power on receiving symbols that the UE will have to discard later if the UE is not scheduled any download data. Examples of a second set of receiver antennas that may be used include, but are not limited to, the use of one out of two receiver chains in the UE, or using a low power mode in two receiver chains. The choice of which second set of receiver antennas to use may be taken according to what form of download data is expected. For example, if the UE expects a rank two transmission, (i.e. during multiple-input-multiple-output (MIMO) transmissions in which multiple transmissions are sent to the UE), the receiver may be adapted to use two low power receiver chains rather than turning off one of the receiver chains and using the other in high power mode. As such, when the receiver is adapted to decode MIMO with rank M, the M receiver chains may be operated in low power mode during a first power mode of operation, and the M receiver chains in a high power mode during a second power mode of operation.

The receiver described above can therefore be controlled to operate in a first power mode during a first portion of a particular connection state of a communication protocol being used by a telecommunication network, and in a second power mode during a second portion of that particular connection state.

Optionally, in step 807, when the UE has decoded the control data in the second power mode, the receiver can be configured to operate in a third power mode during a third portion of the connection state, such as during the remaining subframe. For example, the third power mode can be the same as the first power mode if it is determined in the decoding procedure that the UE is scheduled download data (in which case the receiver may be configured to use a high performing or high power set of receiving antennas, for example two out of two receiver chains). Alternatively, the third power mode can be the same as the second power mode, for example if it is determined during the decoding procedure that no download data is scheduled for the UE (in which case the receiver may be configured to use a low performing or low power set of receiving antennas, for example zero receiver chains). Alternatively the third power mode can be different to the first and second power modes, for example a lower power mode. The first portion of a connection state can comprise a "first part" of the connection state, or "first time period within a connection state". The same applies to the second and third portions, whereby these can include a second part or third part respectively, or second period of time within a connection state or third period of time within a connection state, respectively.

In the above described embodiment, since in LTE the PDCCH is included in the first OFDM symbols in the subframe, this enables the embodiment to change power mode within the subframe in the event that no data is scheduled to the terminal in the subframe. This particular embodiment is therefore configured to adapt the power mode of the radio receiver based on which (OFDM) symbol is currently received.

This has the advantage of reducing power consumption compared to prior art solutions which assume the same receiver performance (and hence same worst case design of receiver parameter setting) for the entire subframe.

Optionally, with the embodiment described above, a threshold parameter, for example a signal-to-noise (SNR) threshold, can be applied to the invention, such that the receiver power mode is only changed if the estimated received SNR is above a certain level. In this manner the provision of the power mode control can be dynamically used depending on the SNR in a particular environment/location of the UE. In such an option the parameter such as SNR can be used to override the power mode control, such that a change of power mode during a particular connection state is only enabled if some other parameter such as SNR is satisfied.

Optionally the probability of receiving download data can be applied to the embodiment above. For example, if the UE has recently had a negative acknowledge message (NACK) during previously downloaded data, the UE can be controlled such that it does not switch to a second power mode (for example having a lower performance second set of receiver antennas) during the decoding process. As such, if the UE has experienced low performance in earlier received packets (i.e. erroneous decoding which has resulted in a NACK of the packet being transmitted) when using the second power mode, the control unit can override the power saving feature, in the same way as the SNR can override as discussed above.

With such an embodiment the UE is able to detect the control channel with high performance. This is due to the fact that the CCH is received using a high power mode. However, there is a higher probability for PDSCH CRC fail since during the second antenna set the received SNR is lower. This is because a low power mode has worse receiver performance and hence lower SNR. If CRC passes the UE sends an acknowledgement message (ACK), but if CRC fails the UE sends a NACK. However this is a better case than the terminal not being able to decode the CCH, because in such a scenario it would then revert to the base station to determine that the UE has missed the CCH, and that could introduce very large delays which would degrade the TCP/IP performance. In other words, in such a scenario if the UE was not able to detect that a CCH message was for it, it would respond by sending nothing. This would mean that the base station would have to detect that the UE was not responding, which would be a much harder case than detecting the UE sending ACK/NACK messages. Further, if the base station did not hear any response from the UE in such a scenario, the base station would have to determine if the UE did not send anything or if the received signal quality at the base station was so bad that the base station was not able to detect the signal from the UE. In contrast to this, this particular embodiment is adapted to send a NACK if CRC fails.

Although the embodiment above has been described using a high power mode during a first portion of the connection state (i.e. during the UE control channel reception period) and a low power mode during a second portion of the connection state (i.e. during the UE control channel decoding period), in certain scenarios, such as when SNR is high, the reverse may be used, i.e. a low power mode during the control channel reception period and a high power mode during a control channel decoding period. For example, when SNR is above a certain value, for example SNR>10 dB, it is relatively straightforward to decode the CCH using one antenna, although for data two receiver antennas might be needed for data (for example when using MIMO). In such a scenario a low power mode can be used for CCH reception and a high power mode after CCH reception.

Figure 9:
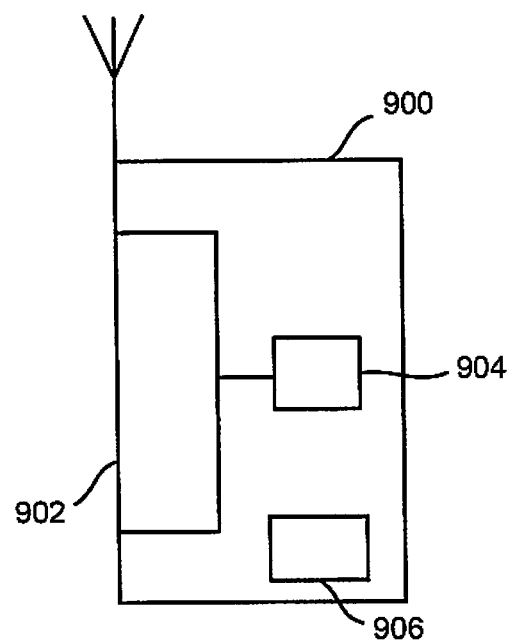
FIG. 9 shows a receiver according to an embodiment described in FIGS. 7 and 8.

FIG. 9 shows an embodiment of a receiver apparatus 900 that is adapted to perform the method described in FIGS. 7 and 8. The receiver apparatus 900 comprises a power control unit 902 that is adapted to operate the receiver in a first power mode during a first portion of a particular connection state of a communication protocol being used by a telecommunications network, and operate the receiver in a second power mode during a second portion of the particular connection state. The receiver apparatus further comprises a power mode timer unit 904 for controlling when the power control unit transitions from a first power mode to a second power mode. The power mode timer unit 904 is operated in relation to the timing of the symbols in the received frame. The receiver apparatus will have knowledge of the timing of received symbols, for example the length in time of OFDM symbols and start time of subframes. Therefore, according to one embodiment the power mode timer unit 904 may comprise a timer which is triggered by the start of a subframe, and the duration of which timer is related to a number of symbols (a multiple of the length in time of a symbol). According to another embodiment, the power mode timer unit 904 may comprise a counter for counting the number of symbols in order to trigger the transition from the first power mode to the second power mode. The receiver also comprises a determining means 906 for determining the third power mode to be used by the power control unit 902.

In the embodiments described above the radio receiver has been described as using a first set of receiver antennas in a first power mode and a second set of receiver antennas in a second power mode (for example two receiver antennas in the first power mode and one receiver antenna in the second power mode). It is noted, however, that the invention is intended to embrace the radio receiver being adapted in any one or more of a number of ways to provide a first power mode and a second power mode of operation (or a third power mode).

For example, the receiver may be adapted to change at least one of the following parameters in the radio receiver according to whether the receiver is adapted to operate in the first power mode or the second power mode:

adapting the gain of a low noise amplifier (LNA);
adapting the bias current of a LNA (affecting linearity and noise);

adapting the device size and/or number of cells in a mixer or local oscillator circuit (affecting noise and gain)

adapting the gain of a variable gain amplifier, VGA (affecting noise and linearity);

adapting the order and/or current of a channel select filter (affecting noise and linearity);

adapting the order and/or operating frequency and/or currents of an analog to digital converter (affecting noise, stability, and linearity).

It will be appreciated that any combination of the above features may be used in the first and second power modes for adapting the power level of the receiver in the respective modes of operation.

The invention has the advantage of minimizing power consumption in a radio receiver, in particular by changing power modes during a particular connection state of the receiver.

Although certain embodiments have been described using the on-timer and inactivity-timer of a telecommunications network, it is noted that the embodiments may be used in conjunction with other network timers.

Furthermore, although certain embodiments have been described as using one receiver antenna or two receiver antennas in a receiver chain, a receiver chain could include any number of receiver antennas without departing from the scope of the invention.

In addition, although certain embodiment have been described as having first, second and third power modes, the invention may have any further number of power modes within a particular connection state.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of reducing power consumption in a receiver apparatus of a telecommunications network, the method comprising:
    operating the receiver in a first power mode during a first portion of a particular connection state of a communication protocol being used by the telecommunications network;
    operating the receiver in a second power mode during a second portion of the particular connection state, the second power mode being a reduced power mode compared to the first power mode;
    wherein the receiver is on during the first portion and the second portion of the particular connection state;
    controlling the transition from the first power mode to the second power mode using a power mode timer circuit;
    triggering the power mode timer circuit simultaneously with a telecommunications network timer;
    wherein a duration of the power mode timer circuit is less than a duration of the telecommunications network timer.

2. The method of claim 1, wherein the duration of the power mode timer circuit is, during use, dynamically adapted based on historical data received from one or more previous operations of the connection state.

3. The method of claim 1, wherein the power mode timer circuit is triggered by one or more timing signals received from the telecommunications network.

4. The method of claim 3, wherein the telecommunications network timer is an inactivity timer.

5. The method of claim 1:
    wherein the first portion of the connection state comprises a control information receiving period at the receiver;
    wherein the second portion of the connection state comprises a control information decoding period at the receiver.

6. The method of claim 5, further comprising operating the receiver in a third power mode during a third portion of the connection state.

7. The method of claim 6, wherein the configuration of the receiver in the third power mode is based on information determined during the operation of the receiver in the second power mode.

8. The method of claim 1, further comprising adapting one or more radio parameters between the first power mode and the second power mode.

9. The method of claim 8, wherein the one or more radio parameters comprise at least one of:
    a number of receiver antennas;
    a gain or bias current of a low noise amplifier;
    a gain of a variable gain amplifier;
    a device size of a mixer circuit or local oscillator driver circuit;
    an order or current in a channel select filter;
    a current, operating frequency, or order of an analog to digital converter.

10. A receiver, comprising:
    a power control circuit configured to:
        operate the receiver in a first power mode during a first portion of a particular connection state of a communication protocol being used by a telecommunications network;
        operate the receiver in a second power mode during a second portion of the particular connection state, wherein the second power mode is a reduced power mode compared to the first power mode;
    wherein the receiver is on during the first portion and the second portion of the particular connection state;
    a power mode timer circuit configured to control the power control circuit, wherein the power mode timer circuit is triggered in relation to a network timing signal;
    wherein the power mode timer circuit is configured to be triggered simultaneously with a telecommunications network timer;
    wherein a duration of the power mode timer circuit is less than a duration of the telecommunications network timer.

11. The receiver of claim 10 wherein the power control circuit is configured to operate the receiver:
    in the first power mode during a control information receiving period at the receiver;
    in the second power mode during a control information decoding period at the receiver.

12. The receiver of claim 10:
    further comprising memory for storing historical data;
    wherein the power mode timer circuit is dynamically configurable based the historical data stored in the memory.

13. The receiver of claim 12, wherein the telecommunications network timer is an inactivity timer.

14. The receiver of claim 10, wherein the power mode timer circuit is configured to be dynamically adapted, during use, based on historical data received from one or more previous operations of the connection state.

15. The receiver of claim 10:
  wherein the first portion of the connection state comprises a control information receiving period at the receiver;
  wherein the second portion of the connection state comprises a control information decoding period at the receiver apparatus.

16. The receiver of claim 10, wherein the receiver is configured to change one or more radio parameters between the first power mode and the second power mode.

17. The receiver apparatus as claimed in claim 16, wherein the one or more radio parameters comprise at least one of:
  the number of receiver antennas;
  a gain or bias current of a low noise amplifier;
  a gain of a variable gain amplifier;
  a device size of a mixer circuit or local oscillator driver circuit;
  an order or current in a channel select filter;
  a current, operating frequency, or order of an analog to digital converter.

* * * * *

UNITED STATES PATENT AND TRADEMARK OFFICE
CERTIFICATE OF CORRECTION

| | | |
|---|---|---|
| PATENT NO. | : 8,903,349 B2 | Page 1 of 1 |
| APPLICATION NO. | : 13/885186 | |
| DATED | : December 2, 2014 | |
| INVENTOR(S) | : Lindoff et al. | |

It is certified that error appears in the above-identified patent and that said Letters Patent is hereby corrected as shown below:

In the Claims

In Column 13, Line 10, in Claim 17, delete "receiver apparatus" and insert -- receiver --, therefor.

Signed and Sealed this
Thirtieth Day of June, 2015

Michelle K. Lee
*Director of the United States Patent and Trademark Office*